(12) United States Patent
LaFarelle et al.

(10) Patent No.: US 9,256,787 B2
(45) Date of Patent: Feb. 9, 2016

(54) CALCULATION OF NUMERIC OUTPUT ERROR VALUES FOR VELOCITY ABERRATION CORRECTION OF AN IMAGE

(71) Applicant: Raytheon Company, Waltham, MA (US)

(72) Inventors: Sarah Anne LaFarelle, Wylie, TX (US); Archie Henry Muse, Dallas, TX (US)

(73) Assignee: Raytheon Company, Waltham, MA (US)

( * ) Notice: Subject to any disclaimer, the term of this patent is extended or adjusted under 35 U.S.C. 154(b) by 206 days.

(21) Appl. No.: 14/151,303

(22) Filed: Jan. 9, 2014

(65) Prior Publication Data

US 2015/0193647 A1 Jul. 9, 2015

(51) Int. Cl.
*G06K 9/00* (2006.01)
*G06F 17/50* (2006.01)
*G06T 7/00* (2006.01)
*G06T 7/60* (2006.01)

(52) U.S. Cl.
CPC .......... *G06K 9/0063* (2013.01); *G06F 17/5009* (2013.01); *G06T 7/0034* (2013.01); *G06T 7/60* (2013.01); *G06F 2217/10* (2013.01); *G06T 2207/10032* (2013.01)

(58) Field of Classification Search
None
See application file for complete search history.

(56) References Cited

U.S. PATENT DOCUMENTS

| 6,027,447 | A  | * | 2/2000 | Li ........................ | G01S 7/52049 600/447 |
| 6,597,304 | B2 | * | 7/2003 | Fienup .................. | G01S 7/4004 342/159 |
| 2007/0038374 | A1 | * | 2/2007 | Belenkii .............. | G01C 21/025 701/500 |
| 2012/0245906 | A1 | * | 9/2012 | Kareem .................. | G06F 17/18 703/2 |
| 2014/0126836 | A1 | * | 5/2014 | Flanders .............. | H04N 5/3675 382/275 |

OTHER PUBLICATIONS

Greslou, D., F. De Lussy, and J. Montel. "Light aberration effect in HR geometric model." Proceedings of the ISPRS Congress. 2008.*

(Continued)

*Primary Examiner* — Bhavesh Mehta
*Assistant Examiner* — Sean Conner
(74) *Attorney, Agent, or Firm* — Schwegman Lundberg & Woessner, P.A.

(57) ABSTRACT

When correcting for velocity aberration in satellite imagery, a closed-form error covariance propagation model can produce more easily calculable error terms than a corresponding Monte Carlo analysis. The closed-form error covariance propagation model is symbolic, rather than numeric. The symbolic error covariance propagation model relates input parameters to one another pairwise and in closed form. For a particular image, the symbolic error covariance propagation model receives an input measurement value and an input error value for each input parameter. The symbolic error covariance propagation model operates on the input values to produce a set of output correction values, which correct for velocity aberration. The output correction values can be used to convert apparent coordinate values to corrected coordinate values. The symbolic error covariance matrix operates on the input error values to produce a set of output error values, which identify a reliability of the corrected coordinate values.

18 Claims, 2 Drawing Sheets

(56) References Cited

OTHER PUBLICATIONS

Ignatenko, Y., et al. "Measurment of Anomalous Angle of Deviation of Light During Satellite Laser Ranging." 16th International Workshop on Laser Ranging, Poznan Poland. 2008.*

Leprince, Sébastien, et al. "Automatic and precise orthorectification, coregistration, and subpixel correlation of satellite images, application to ground deformation measurements." Geoscience and Remote Sensing, IEEE Transactions on 45.6 (2007): 1529-1558.*

* cited by examiner

CALCULATION OF NUMERIC OUTPUT ERROR VALUES FOR VELOCITY ABERRATION CORRECTION OF AN IMAGE

TECHNICAL FIELD

Examples pertain generally to correcting registration errors in satellite imagery (errors in mapping from a point in an image to its corresponding point on the earth's surface), and more particularly to calculating error terms when correcting for velocity aberration in satellite images.

BACKGROUND

There are several near earth orbiting commercial satellites that can provide images of structures or targets on the ground. For applications that rely on these images, it is important to accurately register the images to respective coordinates on the ground.

For satellite-generated images of earth-based targets, one known source of misregistration is referred to as velocity aberration. Velocity aberration can arise in an optical system with a sufficiently large velocity relative to the point being imaged. A typical velocity of a near earth orbiting commercial satellite can be on the order of 7.5 kilometers per second, with respect to a location on the earth directly beneath the satellite. This velocity is large enough to produce a registration error of several detector pixels at the satellite-based camera.

The correction for velocity aberration is generally well-known. However, it is generally challenging to calculate error terms associated with the correction. These error terms estimate the confidence level, or reliability, of the velocity aberration correction.

Historically, error calculation for velocity aberration correction has been treated statistically with a Monte Carlo analysis. In general, these Monte Carlo analyses can be time-consuming and computationally expensive. In order to produce statistically significant results, a Monte Carlo analysis can require that a large number of simulated cases be executed and analyzed, which can be difficult or impossible due to the limitations of computational resources and processing time requirements. As a result, error estimation for velocity aberration correction can be lacking.

SUMMARY

When correcting for velocity aberration in satellite imagery, a closed-form covariance matrix propagation can produce more reliable and more easily calculable error terms than a corresponding matrix generated by a Monte Carlo analysis. Performing calculations with the closed form covariance matrix can be significantly faster than with a corresponding Monte Carlo analysis, can provide greater immunity to data outliers, and can provide immediate checks for statistical consistency.

The closed-form covariance matrix propagation is symbolic, rather than numeric. The symbolic covariance matrix propagation relates the known covariance matrix of the input parameters to the resulting covariance matrix of the aberration correction terms in closed form. For a particular image, one employs the required input parameters to compute the velocity aberration correction terms at a selected point in the image. The covariance matrix of the velocity aberration correction terms is then computed from the required input parameters, calculated velocity aberration terms, and the input parameter covariance matrix. The numerical values for the input parameter covariance matrix are received and the symbolic formulas are used to calculate the numerical values for the covariance matrix of the velocity aberration correction terms.

The input and output error values are numerical values that indicate a reliability, or confidence level, of a corresponding numerical coordinate value or correction value. For instance, for a set of coordinates (x, y, z), the corresponding error values can be ($\sigma_x$, $\sigma_y$, $\sigma_z$). The value of $\sigma_x$ represents the standard deviation of x, while $\sigma_x^2$ denotes the variance of x. In general, as the error value $\sigma_x$ decreases, the confidence in the reported value of x increases.

This summary is intended to provide an overview of subject matter of the present patent application. It is not intended to provide an exclusive or exhaustive explanation of the invention. The Detailed Description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
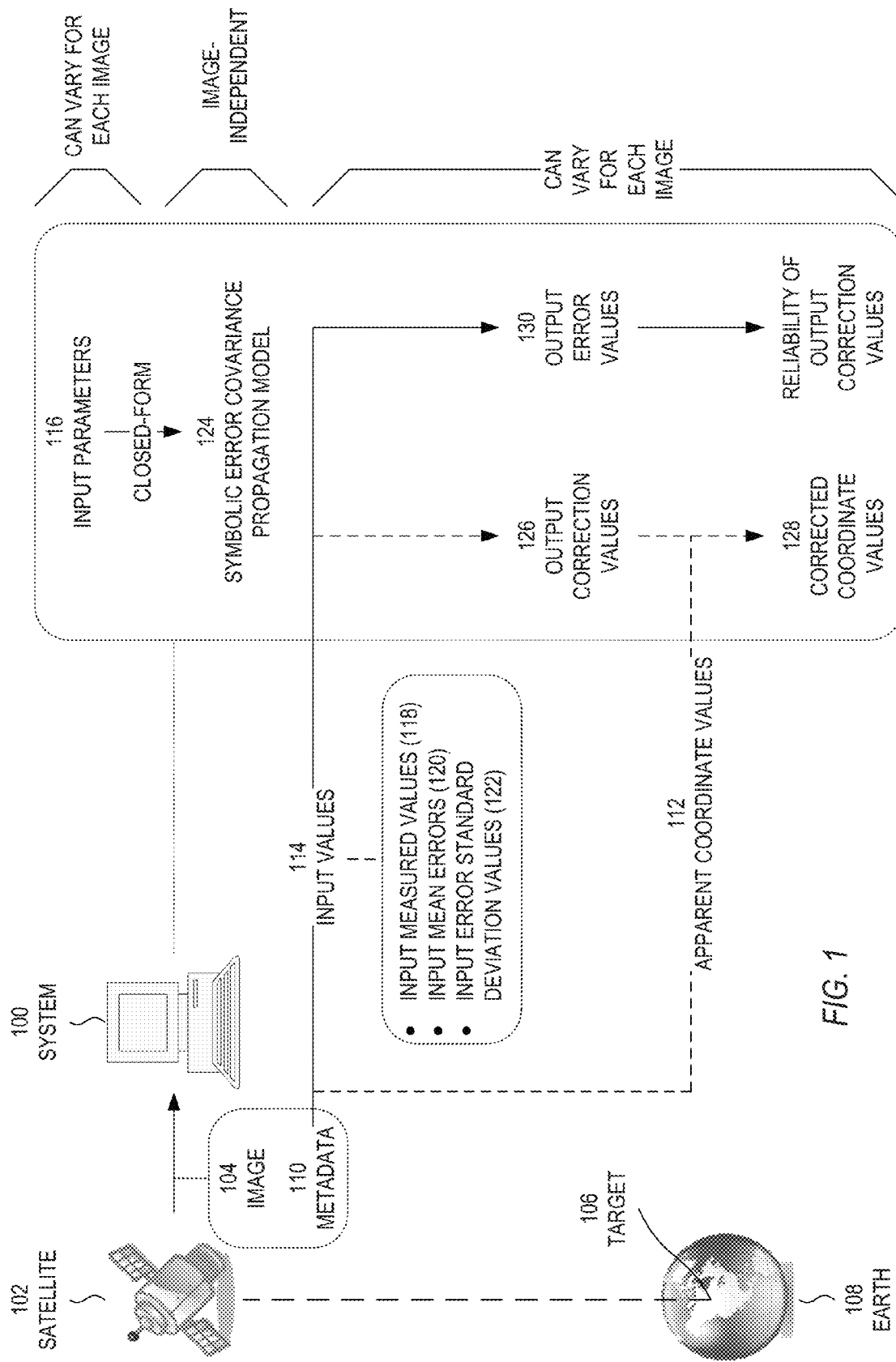
FIG. 1 is a schematic drawing of an example of a system for receiving and processing imagery, such as satellite imagery, in accordance with some embodiments.

FIG. 1 is a schematic drawing of an example of a system 100 for receiving and processing imagery, such as satellite imagery. A satellite 102, such as an IKONOS or another near earth orbiting commercial satellite, captures an image 104 of a target 106 on earth 108. The system 100 downloads the captured image 104, along with associated metadata 110 corresponding to conditions under which the image 104 was taken.

The metadata 110 includes a set of apparent coordinate values 112 corresponding to a selected point in the image. The apparent coordinate values 112 suffer from velocity aberration. Velocity aberration is generally well-understood in the fields of astronomy and space-based imaging. Velocity aberration produces a pointing error, so that the image 104 formed at the sensor on the satellite is translated away from its expected location. If velocity aberration is left uncorrected, the image 104 and corresponding location on the target 106 can be misregistered with respect to each other. Velocity aberration does not degrade the image 104. The system 100 provides a correction for the velocity aberration, and additionally provides a measure of reliability of the correction.

The metadata 110 also includes plurality of input values 114 for corresponding input parameters 116. The input parameters 116 are geometric quantities, such as distances and angular rates that define the satellite sensor's position and velocity. The input parameters 116 are defined symbolically and not numerically. The input values 114 are numeric, with numerical values that correspond to the input parameters 116.

Each input value 114 includes an input measured value 118, an input mean error 120, and an input error standard deviation value 122. Each input measured value 118 represents a measurement of a corresponding input parameter 116 via onboard satellite instruments; this can be a considered a best estimate of the value of the input parameter. Each input mean error 120 represents an inherent bias of the corresponding input measured value 118; if there is no bias, then the input mean error 120 is zero. Each input error standard deviation value 122 represents a reliability of the best estimate. A relatively low input error standard deviation value 122 implies a relatively high confidence in the corresponding input measured value 118, and a relatively high input error standard deviation value 122 implies a relatively low confidence in the corresponding input measured value 118. In some examples, at least one mean input error standard deviation value 122 remains invariant for multiple images taken with a particular telescope in the satellite 102. In some examples, all the input error standard deviation values 122 remain invariant for multiple images taken with a particular telescope in the satellite 102.

A symbolic error covariance propagation model 124 receives the input values 114 in the metadata 110. The symbolic error covariance propagation model 124 includes a symbolic covariance matrix that relates the input parameters 116 to one another pairwise and in closed form. The symbolic covariance matrix can be image-independent, and can be used for other optical systems having the same configuration of input parameters 116. The symbolic covariance matrix is symbolic, not numeric. In some examples, the input parameters 116 and the symbolic covariance matrix remain invariant for multiple images taken with a particular telescope in the satellite 102. The Appendix to this document includes a mathematical derivation of an example of a suitable symbolic covariance matrix.

Velocity aberration correction generates a set of output correction values 126 from the required input values 114. The output correction values 126 relate the apparent coordinate values 112 to a set of corrected coordinate values 128, and can therefore correct for velocity aberration in the image 104. The corrected coordinate values 128 can be stored, along with the image 104, and can be presented to a user as a best estimate of coordinates within the image 104.

The symbolic error covariance propagation model 124 generates a set of output error values 130 from the input values 114. The output error values 130 identify a reliability of the output correction values 126. The output error values 130 can also be stored, along with the image 104, and can be presented to a user as a measure of reliability of the coordinate correction.

As an example, a user of the system 100 can download an image 104 with metadata 110. The system 100 can extract the suitable input values 114 from the metadata 110. The system 100 can use extracted input values 114 to calculate output correction values 126 to correct for velocity aberration in the image 104. The system 100 can apply the output correction values 124 to a set of apparent coordinate values 112 to generate a set of corrected coordinate values 128. The system 100 can use the input values 114 to calculate output error values 130 that estimate a confidence level or reliability of the corrected coordinate values 128. The system can present to the user the image 104, the corrected coordinate values 128, and the output error values 130.

The system 100 can be a computer system that includes hardware, firmware and software. Examples may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some examples, computer systems can include one or more processors, optionally connected to a network, and may be configured with instructions stored on a computer-readable storage device.

The input parameters 116 can include a separation between a center of mass of a telescope and a vertex of a primary mirror of the telescope, and include x, y, and z components of: a geocentric radius vector to a center of mass of the telescope; a velocity vector to the center of mass of the telescope; a geocentric radius vector to a target ground point; an angular rate vector of a body reference frame of the telescope; and a unit vector along a z-axis of the body reference frame of the telescope. These input parameters are but one example; other suitable input parameters 116 can also be used.

Figure 2:
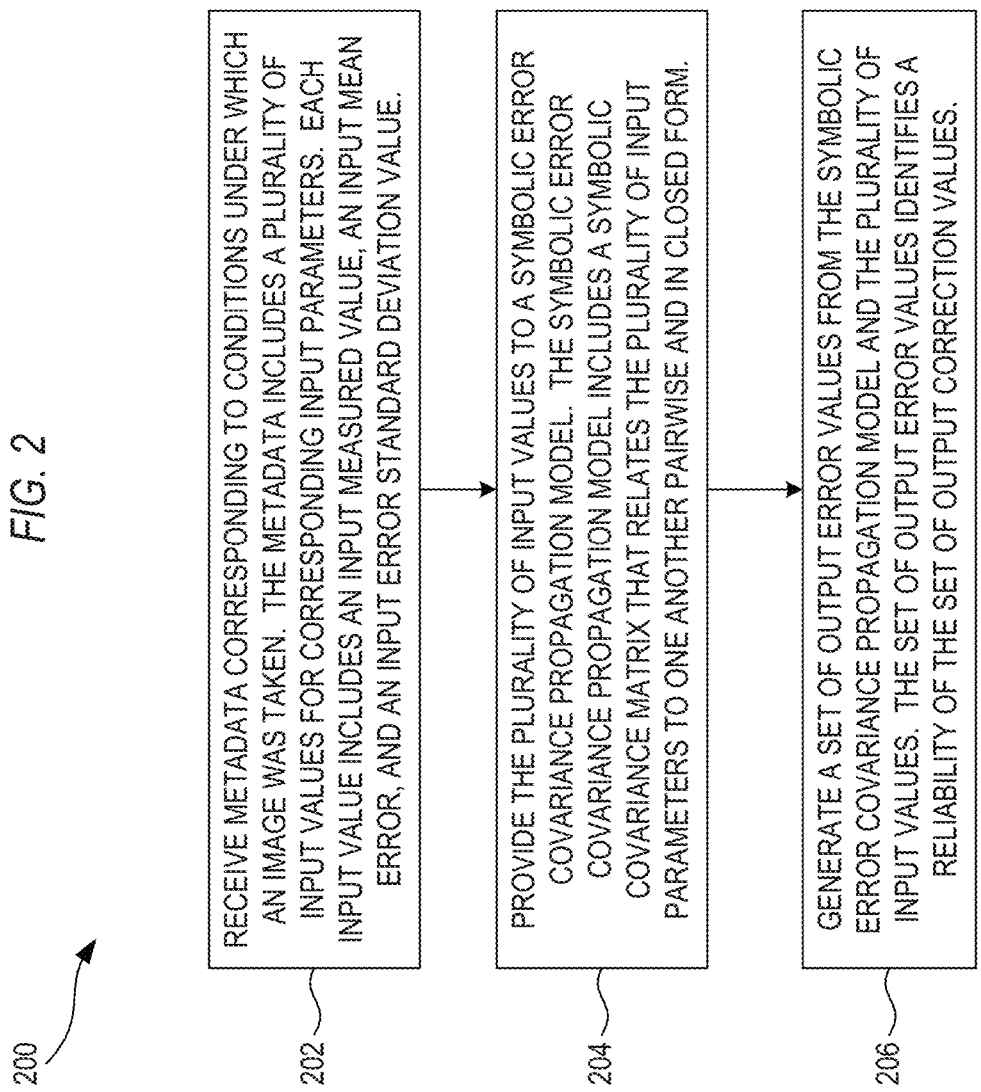
FIG. 2 is a flow chart of an example of a method for calculating numeric output error values for velocity aberration correction of an image, in accordance with some embodiments.

FIG. 2 is a flow chart of an example of a method 200 for calculating numeric output error values for an image. The image has a corresponding set of output correction values that correct for velocity aberration. The method 200 can be executed by system 100 of FIG. 1, or by another suitable system.

At 202, method 200 receives metadata corresponding to conditions under which an image was taken. The metadata includes a plurality of input values for corresponding input parameters. Each input value includes an input measured value, an input mean error, and an input error standard deviation value. At 204, method 200 provides the plurality of input values to a symbolic error covariance propagation model. The symbolic error covariance propagation model includes a symbolic covariance matrix that relates the plurality of input parameters to one another pairwise and in closed form. At 206, method 200 generates a set of output error values from the symbolic error covariance propagation model and the plurality of input values. The set of output error values identifies a reliability of the set of output correction values.

The remainder of the Detailed Description is an Appendix that includes a mathematical derivation of an example of a symbolic error covariance propagation model that is suitable for use in the system 100 of FIG. 1. The derived symbolic error covariance propagation model uses the input parameters 116, as noted above.

APPENDIX

Beginning with the well-known Lorentz transformations from special relativity, one can relativistically formulate a true line of sight correction process, then use a first-order differential approximation to construct a covariance propagation model of the aberration correction process. The first-order differential approximation acknowledges that relative velocities between reference frames are significantly less than the speed of light, which is the case for near earth orbiting commercial satellites.

There are sixteen input parameters employed in the calculation of the corrected line-of-sight. Each input parameter has an input measured value (X), an input mean error value ($\mu_X$), and an input error term ($\sigma_X$).

The sixteen input error terms are defined symbolically as follows. Quantities $\Delta x_{cm}$, $\Delta y_{cm}$, $\Delta z_{cm}$ are three random error components of a geocentric radius vector $\bar{R}_{CM}$ to a telescope center of mass. Quantities $\Delta v_{xcm}$, $\Delta v_{ycm}$, $\Delta v_{zcm}$ are three random error components of a velocity vector $\dot{\bar{R}}_{CM}$ to the telescope center of mass. Quantities $\Delta x_p$, $\Delta y_p$, $\Delta z_p$ are three random error components of a geocentric radius vector $\bar{R}_P$ to a target ground point. Quantity $\Delta d_z$ is a random error component of a distance from a center of mass to the vertex of the telescope's primary mirror. Quantities $\Delta \omega_{xb}$, $\Delta \omega_{yb}$, $\Delta \omega_{zb}$ are three random error components of an angular rate vector $\bar{\omega}_B$ of the telescope's body reference frame. Quantities $\Delta z_{xb}$, $\Delta z_{yb}$, $\Delta z_{zb}$ are three random error components of a unit vector $\hat{Z}_B$ along a Z axis of the telescope's body frame. In some examples, one or more of the sixteen input error terms can be omitted.

Quantity $\Delta \hat{q}'_{3\times1}$ is an error vector for corrected (true) line-of-sight components:

$$\Delta \hat{q}'_{3\times1} = \begin{pmatrix} \Delta x_{true} \\ \Delta y_{true} \\ \Delta z_{true} \end{pmatrix}$$

Quantity $H_{3\times16}$ is a matrix of partial derivations of the three components of the error vector $\Delta \hat{q}'_{3\times1}$, with respect to the sixteen input error terms:

$$H_{3\times16} = \begin{pmatrix} \frac{\partial q'_x}{\partial x_{cm}} & \frac{\partial q'_x}{\partial y_{cm}} & \frac{\partial q'_x}{\partial z_{cm}} & \frac{\partial q'_x}{\partial v_{xcm}} & \cdots & \frac{\partial q'_x}{\partial z_{zb}} \\ \frac{\partial q'_y}{\partial x_{cm}} & \frac{\partial q'_y}{\partial y_{cm}} & \frac{\partial q'_y}{\partial z_{cm}} & \frac{\partial q'_y}{\partial v_{xcm}} & \cdots & \frac{\partial q'_y}{\partial z_{zb}} \\ \frac{\partial q'_z}{\partial x_{cm}} & \frac{\partial q'_z}{\partial y_{cm}} & \frac{\partial q'_z}{\partial z_{cm}} & \frac{\partial q'_z}{\partial v_{xcm}} & \cdots & \frac{\partial q'_z}{\partial z_{zb}} \end{pmatrix}$$

Quantity $\Delta \vec{\Psi}_{16\times1}$ is an input error vector, formed from the sixteen input error terms:

$$\Delta \vec{\Psi}_{16\times1} = \begin{pmatrix} \Delta x_{cm} \\ \Delta y_{cm} \\ \Delta z_{cm} \\ \Delta v_{xcm} \\ \Delta v_{ycm} \\ \Delta v_{zcm} \\ \Delta x_p \\ \Delta y_p \\ \Delta z_p \\ \Delta d_Z \\ \Delta \omega_{xb} \\ \Delta \omega_{yb} \\ \Delta \omega_{zb} \\ \Delta z_{xb} \\ \Delta z_{yb} \\ \Delta z_{zb} \end{pmatrix}$$

A first-order differential approximation can linearly relate the quantities $\Delta \hat{q}'_{3\times1}$, $H_{3\times16}$, and $\Delta \vec{\Psi}_{16\times1}$ to one other:

$$\Delta \hat{q}'_{3\times1} = H_{3\times16} \Delta \vec{\Psi}_{16\times1}$$

Applying an expectation operator leads to:

$$\langle \Delta \hat{q}'_{3\times1} \rangle = H_{3\times16} \langle \Delta \vec{\Psi}_{16\times1} \rangle, \quad (1)$$

Quantity $P_{\Delta\hat{q}'}$ is a covariance $P_{\Delta\hat{q}'}$ of resulting errors in the calculated line-of-sight components, and can be calculated by:

$$P_{\Delta\hat{q}'} \equiv \langle (\Delta\hat{q}' - \langle \Delta\hat{q}' \rangle)(\Delta\hat{q}' - \langle \Delta\hat{q}' \rangle)^T \rangle$$

$$P_{\Delta\hat{q}'} = H \langle (\Delta\vec{\Psi} - \langle \Delta\vec{\Psi} \rangle)(\Delta\vec{\Psi} - \langle \Delta\vec{\Psi} \rangle)^T \rangle H^T$$

$$P_{\Delta\hat{q}'} = H \mathbf{P}_{\Delta\vec{\Psi}} H^T, \quad (2)$$

where $\mathbf{P}_{\Delta\vec{\Psi}}$ is a 16-by-16 covariance matrix of input parameter errors. Equations (1) and (2) form a covariance propagation model. The covariance propagation model relates the means and covariance of the random measurement errors in the parameters input into the aberration correction process to the means and covariance of the components of the corrected true line of sight.

The preceding is but one example of a symbolic error covariance propagation model; other suitable symbolic error covariance propagation models can also be used.

The indicated partial derivatives that constitute the matrix $H_{3\times16}$ are now evaluated in detail. The first step is to give detailed expressions for $q'_x$, $q'_y$, $q'_z$:

$$q'_x = \left( \frac{(\hat{q}\cdot\hat{u})\sqrt{1-\beta^2}}{1-\beta(\hat{q}\cdot\hat{v})} \right)(\hat{u}\cdot\hat{\imath}) + \left( \frac{(\hat{q}\cdot\hat{v})-\beta}{1-\beta(\hat{q}\cdot\hat{v})} \right)(\hat{v}\cdot\hat{\imath}) \quad (3)$$

$$q'_y = \left( \frac{(\hat{q}\cdot\hat{u})\sqrt{1-\beta^2}}{1-\beta(\hat{q}\cdot\hat{v})} \right)(\hat{u}\cdot\hat{\jmath}) + \left( \frac{(\hat{q}\cdot\hat{v})-\beta}{1-\beta(\hat{q}\cdot\hat{v})} \right)(\hat{v}\cdot\hat{\jmath}) \quad (4)$$

$$q'_z = \left( \frac{(\hat{q}\cdot\hat{u})\sqrt{1-\beta^2}}{1-\beta(\hat{q}\cdot\hat{v})} \right)(\hat{u}\cdot\hat{k}) + \left( \frac{(\hat{q}\cdot\hat{v})-\beta}{1-\beta(\hat{q}\cdot\hat{v})} \right)(\hat{v}\cdot\hat{k}) \quad (5)$$

Let $\xi$ represent any of the sixteen scalar input parameters. Direct differentiation of equations 3, 4, and 5 yields:

$$\frac{\partial q'_x}{\partial \xi} = \left[ \frac{\left[\left(\frac{\partial\hat{q}}{\partial\xi}\cdot\hat{u}\right)+\left(\hat{q}\cdot\frac{\partial\hat{u}}{\partial\xi}\right)\right]\sqrt{1-\beta^2} - \frac{(\hat{q}\cdot\hat{u})}{\sqrt{1-\beta^2}}\beta\frac{\partial\beta}{\partial\xi}}{1-\beta(\hat{q}\cdot\hat{v})} \right] \quad (6)$$

$$(\hat{u}\cdot\hat{\imath}) + \left[ \frac{(\hat{q}\cdot\hat{u})\sqrt{1-\beta^2}}{\{1-\beta(\hat{q}\cdot\hat{v})\}^2} \right] \left[ \frac{\partial\beta}{\partial\xi}(\hat{q}\cdot\hat{v}) + \beta\left[ \left(\frac{\partial\hat{q}}{\partial\xi}\cdot\hat{v}\right) + \left(\hat{q}\cdot\frac{\partial\hat{v}}{\partial\xi}\right) \right] \right]$$

$$(\hat{u}\cdot\hat{\imath}) + \left( \frac{(\hat{q}\cdot\hat{v})\sqrt{1-\beta^2}}{1-\beta(\hat{q}\cdot\hat{v})} \right)\left[\left(\frac{\partial\hat{u}}{\partial\xi}\cdot\hat{\imath}\right)\right] + \left[ \frac{\left[\left(\frac{\partial\hat{q}}{\partial\xi}\cdot\hat{v}\right)+\left(\hat{q}\cdot\frac{\partial\hat{v}}{\partial\xi}\right)\right] - \frac{\partial\beta}{\partial\xi}}{1-\beta(\hat{q}\cdot\hat{v})} \right]$$

$$(\hat{v}\cdot\hat{\imath}) + \frac{((\hat{q}\cdot\hat{v})-\beta)}{(1-\beta(\hat{q}\cdot\hat{v}))^2}\left[\frac{\partial\beta}{\partial\xi}(\hat{q}\cdot\hat{v}) + \beta\left\{\left(\frac{\partial\hat{q}}{\partial\xi}\cdot\hat{v}\right) + \left(\hat{q}\cdot\frac{\partial\hat{v}}{\partial\xi}\right)\right\}\right]$$

$$(\hat{v}\cdot\hat{\imath}) + \left(\frac{(\hat{q}\cdot\hat{v})-\beta}{1-\beta(\hat{q}\cdot\hat{v})}\right)\left[\left(\frac{\partial\hat{v}}{\partial\xi}\cdot\hat{\imath}\right)\right]$$

$$\frac{\partial q'_y}{\partial \xi} = \left[ \frac{\left[\left(\frac{\partial\hat{q}}{\partial\xi}\cdot\hat{u}\right)+\left(\hat{q}\cdot\frac{\partial\hat{u}}{\partial\xi}\right)\right]\sqrt{1-\beta^2} - \frac{(\hat{q}\cdot\hat{u})}{\sqrt{1-\beta^2}}\beta\frac{\partial\beta}{\partial\xi}}{1-\beta(\hat{q}\cdot\hat{v})} \right] \quad (7)$$

$$(\hat{u}\cdot\hat{\jmath}) + \left[ \frac{(\hat{q}\cdot\hat{u})\sqrt{1-\beta^2}}{\{1-\beta(\hat{q}\cdot\hat{v})\}^2} \right]\left[\frac{\partial\beta}{\partial\xi}(\hat{q}\cdot\hat{v}) + \beta\left[\left(\frac{\partial\hat{q}}{\partial\xi}\cdot\hat{v}\right) + \left(\hat{q}\cdot\frac{\partial\hat{v}}{\partial\xi}\right)\right]\right]$$

$$(\hat{u}\cdot\hat{\jmath}) + \left(\frac{(\hat{q}\cdot\hat{u})\sqrt{1-\beta^2}}{1-\beta(\hat{q}\cdot\hat{v})}\right)$$

$$\left[\left(\frac{\partial\hat{u}}{\partial\xi}\cdot\hat{\jmath}\right)\right] + \left[\frac{\left[\left(\frac{\partial\hat{q}}{\partial\xi}\cdot\hat{v}\right)+\left(q\cdot\frac{\partial\hat{v}}{\partial\xi}\right)\right] - \frac{\partial\beta}{\partial\xi}}{1-\beta(\hat{q}\cdot\hat{v})}\right](\hat{v}\cdot\hat{\jmath}) +$$

$$\frac{((\hat{q}\cdot\hat{v})-\beta)}{(1-\beta(\hat{q}\cdot\hat{v}))^2}\left[\frac{\partial\beta}{\partial\xi}(\hat{q}\cdot\hat{v}) + \beta\left\{\left(\frac{\partial\hat{q}}{\partial\xi}\cdot\hat{v}\right) + \left(\hat{q}\cdot\frac{\partial\hat{v}}{\partial\xi}\right)\right\}\right](\hat{v}\cdot\hat{\jmath}) +$$

$$\left(\frac{(\hat{q}\cdot\hat{v})-\beta}{1-\beta(\hat{q}\cdot\hat{v})}\right)\left[\left(\frac{\partial\hat{v}}{\partial\xi}\cdot\hat{\jmath}\right)\right]$$

$$\frac{\partial q'_z}{\partial \xi} = \left[\frac{\left[\left(\frac{\partial \hat{q}}{\partial \xi} \cdot \hat{u}\right) + \left(\hat{q} \cdot \frac{\partial \hat{u}}{\partial \xi}\right)\right]\sqrt{1-\beta^2} - \frac{(\hat{q} \cdot \hat{u})}{\sqrt{1-\beta^2}}\beta \frac{\partial \beta}{\partial \xi}}{1-\beta(\hat{q} \cdot \hat{v})}\right] \quad (8)$$

$$(\hat{u} \cdot \hat{k}) + \left[\frac{(\hat{q} \cdot \hat{u})\sqrt{1-\beta^2}}{\{1-\beta(\hat{q} \cdot \hat{v})\}^2}\right]\left[\frac{\partial \beta}{\partial \xi}(\hat{q} \cdot \hat{v}) + \beta\left[\left(\frac{\partial \hat{q}}{\partial \xi} \cdot \hat{v}\right) + \left(\hat{q} \cdot \frac{\partial \hat{v}}{\partial \xi}\right)\right]\right]$$

$$(\hat{u} \cdot \hat{k}) + \left(\frac{(\hat{q} \cdot \hat{u})\sqrt{1-\beta^2}}{1-\beta(\hat{q} \cdot \hat{v})}\right)$$

$$\left[\left(\frac{\partial \hat{u}}{\partial \xi} \cdot \hat{k}\right)\right] + \left[\frac{\left[\left(\frac{\partial \hat{q}}{\partial \xi} \cdot \hat{v}\right) + \left(\hat{q} \cdot \frac{\partial \hat{v}}{\partial \xi}\right)\right] - \frac{\partial \beta}{\partial \xi}}{1-\beta(\hat{q} \cdot \hat{v})}\right](\hat{v} \cdot \hat{k}) +$$

$$\frac{((\hat{q} \cdot \hat{v}) - \beta)}{(1-\beta(\hat{q} \cdot \hat{v}))^2}\left[\frac{\partial \beta}{\partial \xi}(\hat{q} \cdot \hat{v}) + \beta\left\{\left(\frac{\partial \hat{q}}{\partial \xi} \cdot \hat{v}\right) + \left(\hat{q} \cdot \frac{\partial \hat{v}}{\partial \xi}\right)\right\}\right](\hat{v} \cdot \hat{k}) +$$

$$\left(\frac{(\hat{q} \cdot \hat{v}) - \beta}{1-\beta(\hat{q} \cdot \hat{v})}\right)\left[\left(\frac{\partial \hat{v}}{\partial \xi} \cdot \hat{k}\right)\right]$$

The next indicated partial derivatives to be evaluated are:

$$\frac{\partial \beta}{\partial \xi}, \frac{\partial \hat{u}}{\partial \xi}, \frac{\partial \hat{v}}{\partial \xi}, \frac{\partial \hat{q}}{\partial \xi}.$$

Direct differentiation yields:

$$\frac{\partial \beta}{\partial \xi} = \frac{\left\{\frac{\partial \dot{\vec{R}}_{CM}}{\partial \xi} + \frac{\partial d_Z}{\partial \xi}(\vec{\omega}_B \times \hat{Z}_B) + d_Z\left(\frac{\partial \vec{\omega}_B}{\partial \xi} \times \vec{Z}_B + \vec{\omega}_B \times \frac{\partial \vec{Z}_B}{\partial \xi}\right)\right\} \cdot [\dot{\vec{R}}_{CM} + d_Z(\vec{\omega}_B \times \hat{Z}_B)]}{c\sqrt{\left[-\dot{\vec{R}}_{CM} - d_Z(\vec{\omega}_B \times \hat{Z}_B)\right] \cdot \left[-\dot{\vec{R}}_{CM} - d_Z(\vec{\omega}_B \times \hat{Z}_B)\right]}} \quad (9)$$

$$\frac{\partial \hat{u}}{\partial \xi} = \frac{\frac{\partial \hat{q}}{\partial \xi} - \left(\frac{\partial \hat{q}}{\partial \xi} \cdot \hat{v} + \hat{q} \cdot \frac{\partial \hat{v}}{\partial \xi}\right)\hat{v} + (\hat{q} \cdot \hat{v})\frac{\partial \hat{v}}{\partial \xi}}{\sqrt{(\hat{q} - (\hat{q} \cdot \hat{v})\hat{v}) \cdot (\hat{q} - (\hat{q} \cdot \hat{v})\hat{v})}} - \quad (10)$$

$$(\hat{q} - (\hat{q} \cdot \hat{v})\hat{v})\frac{\left\{\frac{\partial \hat{q}}{\partial \xi} - \left(\frac{\partial \hat{q}}{\partial \xi} \cdot \hat{v} + \hat{q} \cdot \frac{\partial \hat{v}}{\partial \xi}\right)\hat{v} + (\hat{q} \cdot \hat{v})\frac{\partial \hat{v}}{\partial \xi}\right\} \cdot (\hat{q} - (\hat{q} \cdot \hat{v})\hat{v})}{[(\hat{q} - (\hat{q} \cdot \hat{v})\hat{v}) \cdot (\hat{q} - (\hat{q} \cdot \hat{v})\hat{v})]^{\frac{3}{2}}}$$

$$\frac{\partial \hat{v}}{\partial \xi} = \frac{-\frac{\partial \dot{\vec{R}}_{CM}}{\partial \xi} - \frac{\partial d_Z}{\partial \xi}(\vec{\omega}_B \times \hat{Z}_B) - d_Z\left(\frac{\partial \vec{\omega}_B}{\partial \xi} \times \hat{Z}_B + \vec{\omega}_B \times \frac{\partial \hat{Z}_B}{\partial \xi}\right)}{\sqrt{-(\dot{\vec{R}}_{CM} - d_Z(\vec{\omega}_B \times \hat{Z}_B)) \cdot (-\dot{\vec{R}}_{CM} - d_Z(\vec{\omega}_B \times \hat{Z}_B))}} + \quad (11)$$

$$\frac{(\dot{\vec{R}}_{CM} + d_Z(\vec{\omega}_B \times \hat{Z}_B))}{\left\{\left[\frac{\partial \dot{\vec{R}}_{CM}}{\partial \xi} + \frac{\partial d_Z}{\partial \xi}(\vec{\omega}_B \times \hat{Z}_B) + d_Z\left(\frac{\partial \vec{\omega}_B}{\partial \xi} \times \hat{Z}_B + \vec{\omega}_B \times \frac{\partial \hat{Z}_B}{\partial \xi}\right)\right] \cdot}$$

$$\frac{(\dot{\vec{R}}_{CM} + d_Z(\vec{\omega}_B \times \hat{Z}_B))\right\}}{\left(\{(-\dot{\vec{R}}_{CM} - d_Z(\vec{\omega}_B \times \hat{Z}_B)) \cdot (-\dot{\vec{R}}_{CM} - d_Z(\vec{\omega}_B \times \hat{Z}_B))\}^{\frac{3}{2}}\right)}$$

$$\frac{\partial \hat{q}}{\partial \xi} = \quad (12)$$

$$\frac{\frac{\partial \vec{R}_P}{\partial \xi} - \frac{\partial d_Z}{\partial \xi}\hat{Z}_B - d_Z\frac{\partial \hat{Z}_B}{\partial \xi} - \frac{\partial \vec{R}_{CM}}{\partial \xi}}{\sqrt{(\vec{R}_P - d_Z\hat{Z}_B - \vec{R}_{CM}) \cdot (\vec{R}_P - d_Z\hat{Z}_B - \vec{R}_{CM})}} - (\vec{R}_P - d_Z\hat{Z}_B - \vec{R}_{CM})$$

$$\frac{\left\{\left(\frac{\partial \vec{R}_P}{\partial \xi} - \frac{\partial d_Z}{\partial \xi}\hat{Z}_B - d_Z\frac{\partial \hat{Z}_B}{\partial \xi} - \frac{\partial \vec{R}_{CM}}{\partial \xi}\right) \cdot (\vec{R}_P - d_Z\hat{Z}_B - \vec{R}_{CM})\right\}}{[(\vec{R}_P - d_Z\hat{Z}_B - \vec{R}_{CM}) \cdot (\vec{R}_P - d_Z\hat{Z}_B - \vec{R}_{CM})]^{\frac{3}{2}}}$$

The remaining partial derivatives to be evaluated are:

$$\frac{\partial \vec{R}_{CM}}{\partial \xi}, \frac{\partial \dot{\vec{R}}_{CM}}{\partial \xi}, \frac{\partial \vec{R}_P}{\partial \xi}, \frac{\partial d_Z}{\partial \xi}, \frac{\partial \vec{\omega}_B}{\partial \xi}, \frac{\partial \hat{Z}_B}{\partial \xi}.$$

Given the possible values that the dummy variable $\xi$ may assume, only sixteen of the partial derivatives above are non-zero. These partial derivatives are:

$$\frac{\partial \vec{R}_{CM}}{\partial x_{cm}} = \frac{\partial \dot{\vec{R}}_{CM}}{\partial v_{xcm}} = \frac{\partial \vec{R}_P}{\partial x_p} = \frac{\partial \vec{\omega}_B}{\partial \omega_{xb}} = \frac{\partial \hat{Z}_B}{\partial Z_{xb}} = \hat{i} \quad (13)$$

$$\frac{\partial \vec{R}_{CM}}{\partial y_{cm}} = \frac{\partial \dot{\vec{R}}_{CM}}{\partial v_{ycm}} = \frac{\partial \vec{R}_P}{\partial y_p} = \frac{\partial \vec{\omega}_B}{\partial \omega_{yb}} = \frac{\partial \hat{Z}_B}{\partial Z_{yb}} = \hat{j} \quad (14)$$

$$\frac{\partial \vec{R}_{CM}}{\partial z_{cm}} = \frac{\partial \dot{\vec{R}}_{CM}}{\partial v_{zcm}} = \frac{\partial \vec{R}_P}{\partial z_p} = \frac{\partial \vec{\omega}_B}{\partial \omega_{zb}} = \frac{\partial \hat{Z}_B}{\partial Z_{zb}} = \hat{k} \quad (15)$$

$$\frac{\partial d_Z}{\partial d_Z} = 1 \quad (16)$$

This constitutes all the partial derivatives needed to evaluate the matrix $H_{3 \times 16}$.

What is claimed is:

1. A method for calculating numeric output error values for an image, the image having a corresponding set of output correction values, the method comprising:
receiving metadata corresponding to the image, wherein the image has been captured by a sensor on a satellite, the metadata including a plurality of input values for corresponding input parameters, the input parameters corresponding to conditions related to the sensor of the satellite at the time the image was captured, each input value including an input measured value, an input mean error, and an input error standard deviation value;
providing the plurality of input values to a symbolic error covariance propagation model, the symbolic error covariance propagation model including a symbolic covariance matrix that relates the plurality of input parameters to one another pairwise and in closed form; and
generating a set of output error values from the symbolic error covariance propagation model and the plurality of input values, the set of output error values identifying a reliability of the set of output correction values that correct for velocity aberration which has translated the image away from an expected location.

2. The method of claim 1, wherein the input parameters include a separation between a center of mass of a telescope and a vertex of a primary mirror of the telescope, and include x, y, and z components of:
- a geocentric radius vector to a center of mass of the telescope;
- a velocity vector to the center of mass of the telescope;
- a geocentric radius vector to a target ground point;
- an angular rate vector of a body reference frame of the telescope; and
- a unit vector along a z-axis of the body reference frame of the telescope.

3. The method of claim 1, wherein each input measured value represents a best estimate of a corresponding input parameter.

4. The method of claim 3, wherein each an input error standard deviation value represents a reliability of the best estimate.

5. The method of claim 1, wherein one or more input error standard deviation values remains invariant for multiple images taken with a particular telescope.

6. The method of claim 1, further comprising generating the set of output correction values from the plurality of input measured values.

7. A system for processing imagery, comprising:
- a processor; and
- memory, coupled to the processor, for storing an image, storing metadata corresponding to the image, and storing a corresponding set of output correction values;
- wherein the processor is configured to:
- receive the metadata, wherein the image has been captured by a sensor on a satellite, the metadata including a plurality of input values for corresponding input parameters, the input parameters corresponding to conditions related to the sensor of the satellite at the time the image was captured, each input value including an input measured value, an input mean error, and an input error standard deviation value;
- provide the plurality of input values to a symbolic error covariance propagation model, the symbolic error covariance propagation model including a symbolic covariance matrix that relates the plurality of input parameters to one another pairwise and in closed form; and
- generate a set of output error values from the symbolic error covariance propagation model and the plurality of input values, the set of output error values identifying a reliability of the set of output correction values that correct for velocity aberration which has translated the image away from an expected location.

8. The system of claim 7, wherein the input parameters include a separation between a center of mass of a telescope and a vertex of a primary mirror of the telescope, and include x, y, and z components of:
- a geocentric radius vector to a center of mass of the telescope;
- a velocity vector to the center of mass of the telescope;
- a geocentric radius vector to a target ground point;
- an angular rate vector of a body reference frame of the telescope; and
- a unit vector along a z-axis of the body reference frame of the telescope.

9. The system of claim 7, wherein each input measured value represents a best estimate of a corresponding input parameter.

10. The system of claim 9, wherein each input error standard deviation value represents a reliability of the best estimate.

11. The system of claim 7, wherein one or more input error standard deviation values remains invariant for multiple images taken with a particular telescope.

12. The system of claim 7, further comprising generating the set of output correction values from the plurality of input measured values.

13. A non-transitory computer-readable storage medium storing a program for causing a computer to implement a method for calculating numeric output error values for an image, the image having a corresponding set of output correction values, the method comprising:
- receiving metadata corresponding to the image, wherein the image has been captured by a sensor on a satellite, the metadata including a plurality of input values for corresponding input parameters, the input parameters corresponding to conditions related to the sensor of the satellite at the time the image was captured, each input value including an input measured value, an input mean error, and an input error standard deviation value;
- providing the plurality of input values to a symbolic error covariance propagation model, the symbolic error covariance propagation model including a symbolic covariance matrix that relates the plurality of input parameters to one another pairwise and in closed form; and
- generating a set of output error values from the symbolic error covariance propagation model and the plurality of input values, the set of output error values identifying a reliability of the set of output correction values that correct for velocity aberration which has translated the image away from an expected location.

14. The computer-readable storage medium of claim 13, wherein the input parameters include a separation between a center of mass of a telescope and a vertex of a primary mirror of the telescope, and include x, y, and z components of:
- a geocentric radius vector to a center of mass of the telescope;
- a velocity vector to the center of mass of the telescope;
- a geocentric radius vector to a target ground point;
- an angular rate vector of a body reference frame of the telescope; and
- a unit vector along a z-axis of the body reference frame of the telescope.

15. The computer-readable storage medium of claim 13, wherein each input measured value represents a best estimate of a corresponding input parameter.

16. The computer-readable storage medium of claim 15, wherein each an input error standard deviation value represents a reliability of the best estimate.

17. The computer-readable storage medium of claim 13, wherein one or more input error standard deviation values remains invariant for multiple images taken with a particular telescope.

18. The computer-readable storage medium of claim 13, further comprising generating the set of output correction values from the plurality of input measured values.

* * * * *